United States Patent
Katayama

(10) Patent No.: US 10,204,050 B2
(45) Date of Patent: Feb. 12, 2019

(54) MEMORY-SIDE CACHING FOR SHARED MEMORY OBJECTS

(71) Applicant: INTERNATIONAL BUSINESS MACHINES CORPORATION, Armonk, NY (US)

(72) Inventor: Yasunao Katayama, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 75 days.

(21) Appl. No.: 15/495,145

(22) Filed: Apr. 24, 2017

(65) Prior Publication Data

US 2018/0307604 A1    Oct. 25, 2018

(51) Int. Cl.
*G06F 12/08* (2016.01)
*G06F 12/0817* (2016.01)
*G06F 12/084* (2016.01)

(52) U.S. Cl.
CPC ........ *G06F 12/0817* (2013.01); *G06F 12/084* (2013.01); *G06F 2212/60* (2013.01); *G06F 2212/621* (2013.01)

(58) Field of Classification Search
CPC ............. G06F 12/084; G06F 2212/621; G06F 2212/60; G06F 12/0817; G06F 13/1663; G06F 2212/656
See application file for complete search history.

(56) References Cited

U.S. PATENT DOCUMENTS

| | | | |
|---|---|---|---|
| 2007/0150658 A1* | 6/2007 | Moses | G06F 12/084 711/130 |
| 2007/0260821 A1 | 11/2007 | Zeffer et al. | |
| 2014/0025897 A1 | 1/2014 | Iyengar | |
| 2014/0289483 A1 | 9/2014 | Hosoda et al. | |
| 2016/0179666 A1* | 6/2016 | Greenspan | G06F 12/082 711/128 |
| 2018/0095878 A1* | 4/2018 | Katayama | G06F 12/084 |

OTHER PUBLICATIONS

David Culler et al., LogP: Towards a Realistic Model of Parallel Computation, PPOPP '93 Proceedings of the fourth ACM SIGPLAN symposium on Principles and practice of parallel programming, May 1993.

Sameer Kumar et al., PAMI: A Parallel Active Message Interface for the Blue Gene/Q Supercomputer, 2012 IEEE 26th International Parallel and Distributed Processing Symposium, Shanghai, May 2012.

Intel® 64 and IA-32 Architectures Software Developer's Manual, vol. 3A: System Programming Guide, Part 1, Sep. 2016.

* cited by examiner

*Primary Examiner* — Hashem Farrokh
(74) *Attorney, Agent, or Firm* — Tutunjian & Bitetto, P.C.; Vazken Alexanian

(57) ABSTRACT

Methods and systems for memory-side shared caching include determining whether a requested memory access is directed to shared portion of memory by referencing a lock address list in a memory controller. If the requested memory access is for the shared portion of memory, it is determined whether an associated data object is present in a memory-side cache. If the associated data object is present in the memory-side cache, the memory-side cache is accessed. If the associated data object is not present in the memory-side cache, an external memory is accessed.

19 Claims, 5 Drawing Sheets

MEMORY-SIDE CACHING FOR SHARED MEMORY OBJECTS

BACKGROUND

Technical Field

The present invention generally relates to data caching and, more particularly, to caching shared memory objects at a memory controller.

Description of the Related Art

The efficient control of multiple accesses for shared objects from processes and threads is a significant challenge in parallel computing systems. The use of processor-side caching has been adopted in various systems and provides efficient controls within each cache coherent domain. However, remote accesses to shared objects from outside the cache coherent domain often become focal points in scaling out the system, particularly for sparse workloads.

SUMMARY

A method for memory-side shared caching includes determining whether a requested memory access is directed to shared portion of memory by referencing a lock address list in a memory controller. If the requested memory access is for the shared portion of memory, it is determined whether an associated data object is present in a memory-side cache. If the associated data object is present in the memory-side cache, the memory-side cache is accessed. If the associated data object is not present in the memory-side cache, an external memory is accessed.

A memory controller includes an input/output (I/O) interface configured to communicate with one or more external processing elements and an external memory. A memory-side cache is configured to store shared data objects. The memory controller includes a lock address list. A cache operation module is configured to determine whether a requested memory access is directed to a shared portion of memory by referencing the lock address list, to determine whether an associated data object is present in the memory-side cache if the requested memory access is for the shared portion of memory, to access the memory-side cache if the associated data object is present in the memory-side cache, and to access the external memory if the associated data object is not present in the memory-side cache.

A processing system includes one or more processing elements, a main memory, and a memory controller in communication with the one or more processing elements and the main memory. The memory controller includes a memory-side cache configured to store shared data objects, a lock address list, and a cache operation module. The cache operation module is configured to determine whether a requested memory access is directed to a shared portion of memory by referencing the lock address list, to determine whether an associated data object is present in the memory-side cache if the requested memory access is for the shared portion of memory, to access the memory-side cache if the associated data object is present in the memory-side cache, and to access the main memory if the associated data object is not present in the memory-side cache.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention provide caching at a memory controller. This provides rapid access to data objects that are shared by multiple processors without needing to make the full round trip to system memory. The memory controller maintains both the cache states and cached data, providing significantly increased speeds for accesses to shared memory over systems that keep shared data in main memory.

Whereas it can be appropriate to use cache ownership states for multiple accesses when local, cache coherent access dominate, this can produce large overheads for remote accesses to gain ownership against other data objects, even making use of cache proxy techniques. By implementing caching in the memory controller, multiple accesses from local and remote processes can be arbitrated at the entry of the shared objects. The cache architecture and procedures that may be used to handle multiple accesses appropriately are disclosed below.

Figure 1:
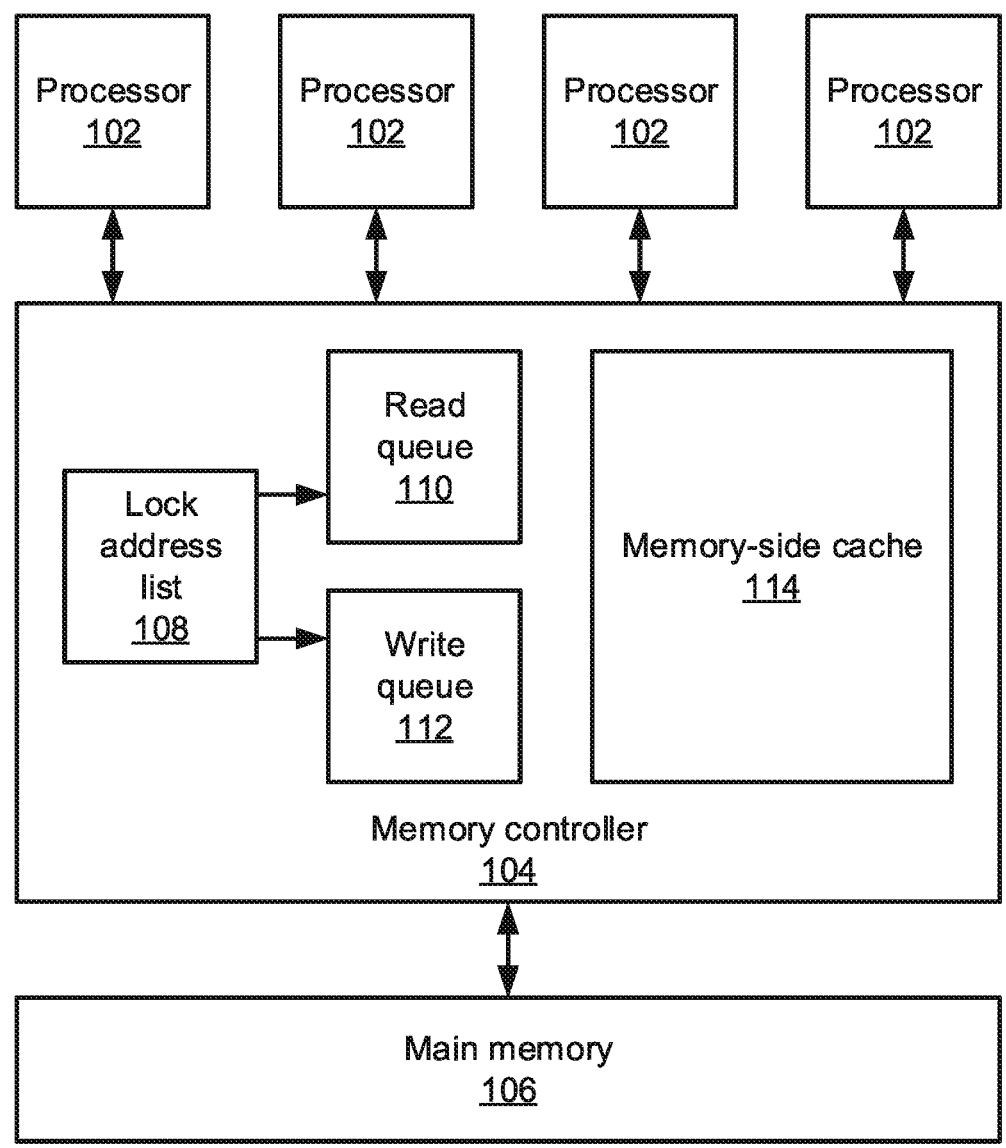
FIG. 1 is a block diagram of a processing system that includes memory-side caching at a memory controller in accordance with an embodiment of the present invention.

Referring now to the drawings in which like numerals represent the same or similar elements and initially to FIG. 1, an exemplified node architecture of a distributed processing system 100 is shown. The processing system 100 includes a plurality of processors 102 (also referred to herein as processing elements). Each processor may be, for example, a single core within a single hardware processor, a discrete processor component unto itself, a logical processor performing threading jobs within a single processor core, etc. Each processor 102 may have its own local cache, such that data may be stored locally for rapid access during processing. The processors 102 communicate with a memory controller 104, which provides an interface to main memory 106. It should be understood that, although the present embodiments are described specifically with respect to system memory such as random access memory, the present principles can be applied to any variety of data storage.

Processors 102 communicate with the memory controller by any appropriate mechanism, including a system bus, network communications, or any other wired or wireless communications medium or protocol. The memory controller 104 similarly communicates with the main memory 106 by any appropriate mechanism. It should be understood that communications between the processors 102 and their respective local cache will be faster than communications between the processors and the memory controller 104, which in turn will be faster than communications between the processors and the main memory 106 that are mediated by the memory controller 104.

The main memory 106 may be any appropriate form of volatile or non-volatile data storage. Examples of main memory 106 include random access memory (RAM), hard disk drives (HDDs), solid state drives (SSDs), optical disc drives, and any other form of data storage device. The memory controller 104 manages accesses to the main memory 106 during distributed operation, maintaining states as the processors 102 perform operations on data stored in the main memory 106. The main memory 106 maintains local caches of shared data objects, so that processors 102 need not wait for the full round trip to main memory 106 when a shared data object is frequently accessed by different processors.

While local cache provides the fastest data access to the respective processors 102, it is difficult to share locally cached data between the processors 102. A high overhead may be incurred if a processor 102 has to fetch data from main memory 106 even though a copy of the data may be stored at another processor 102. By maintaining a memory-side cache 114, the memory controller provides rapid access to shared data objects.

The memory controller maintains a read queue 110 and a write queue 112, by which it interacts with the main memory 106, calling up stored data and making changes to stored data as needed. The read queue 110 and the write queue 112 are controlled by a lock address list 108 that keeps track of which data objects are being accessed by the processors 102 and prevents conflicts between those operations for the shared portions of the main memory 106 that are defined by the entries of the lock address list 108. The lock address list 108 furthermore maintains the state of the shared data object, so that when a processor 102 makes a request to memory, the lock address list 108 determines whether the request is for one of the shared data objects or not. The lock address list 114 maintains a lock bit and memory address for the shared data objects.

In exemplary embodiments, while round trip accesses to main memory 106 can be on the order of hundreds of nanoseconds, the present principles orders of magnitude of improvement. For example, in contexts where the maximum throughput is limited by input/output access round trip times to the main memory 106, effective data access speeds are often on the order of millions of accesses per second. The present embodiments, where memory-side caching is provided by the memory controller 104, maximum effective throughput is limited by the round trip time to the memory-side cache 114 and can be in excess of hundreds of millions of accesses per second. Thus, adding even a relatively small amount of memory-side cache 114 for the shared objects will improve multiple access controls for accessing shared objects from both inside and outside cache coherent domains. This provides superior scaling, particularly for sparse workloads.

Figure 2:
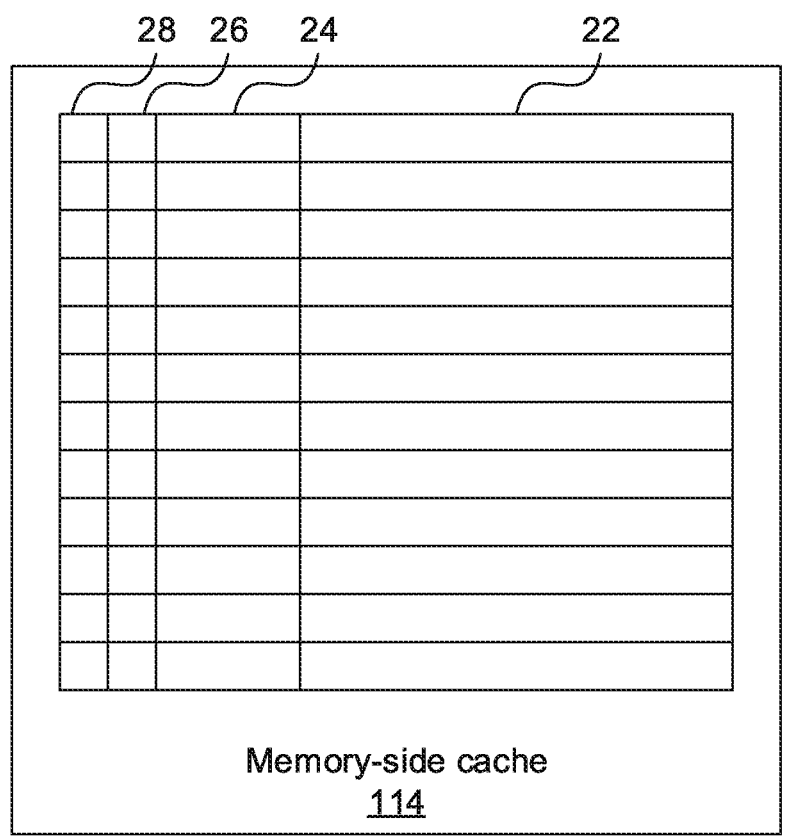
FIG. 2 is a diagram of the structure of the memory-side cache in accordance with an embodiment of the present invention.

Referring now to FIG. 2, further details of the memory-side cache 114 are shown. The present embodiments use a two-stage tag architecture, with one tag stored in the lock address list 108, outside the memory-side cache 114, and with the other tag stored in the memory-side cache 114. The lock address list 108 stores the lock bit associated with a shared data object. The memory-side cache 114 stores a tag that includes control bits such as "valid" 28 and "consume" 26 bits, discussed in greater detail below. As shown, each cache line in the memory-side cache 114 includes a data field 22, a tag field 24, a "consume" bit 26, and a "valid" bit 28.

Figure 3:
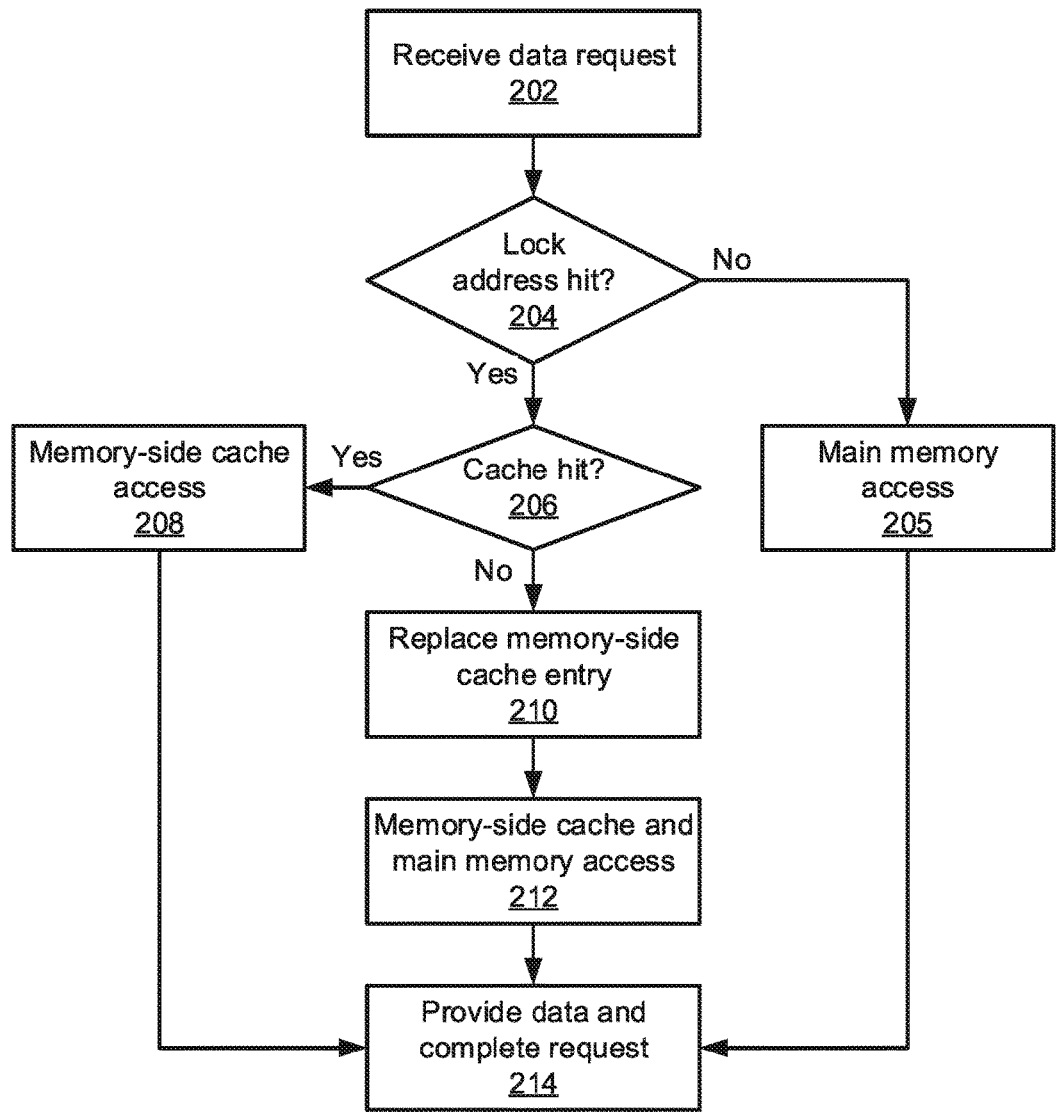
FIG. 3 is a block/flow diagram of a method of performing memory accesses with memory-side caching in accordance with an embodiment of the present invention.

Referring now to FIG. 3, a method of operating a memory-side cache 114 is shown. At block 202, the memory controller 104 receives an access request from one of the processors 102. Block 204 determines whether the access request is for data stored in the lock address list 108. If not, then the memory-side cache tag entry 24 is replaced in block 210 and the memory-side cache 114 main memory 106 are accessed based on a given cache replacement policy. Block 214 then provides data and completes the request.

In some embodiments, the data object is not moved to the memory-side cache 114 without a hit to the lock address list 108 using the two-stage tag architecture. This is because it is preferable to keep the memory-side cache 114 small, such that access is fast and the hit ratio is high. Ordinary memory accesses that do not hit the lock address list 108 are presumably not shared and therefore can be handled with processor-side caches.

If there is a hit in the lock address list 114, block 206 determines whether the memory request is for the memory-side cache 114. It should be noted that data may be locked without being stored in the memory-side cache 114. If there is a hit in the memory-side cache 114, block 208 accesses the memory-side cache 114 and block 214 provides the data and completes the request.

If block 206 determines that there is no hit to the memory-side cache 114, block 210 performs a cache replacement operation to replace a cache entry in the memory-side cache 114 based on a control bit. Any appropriate cache replacement process may be used to perform this cache replacement operation including, for example, first in first out (FIFO), last in first out (LIFO), least recently used (LRU), most recently used (MRU), random replacement (RR), least frequently used (LFU), etc. It should be understood that there are many other cache replacement operations known in the art and that those having ordinary skill in the art will be able to select a cache replacement process that is best suited to their particular application. Block 212 performs a main memory access to call up the data from main memory 106 and stores the data in the appropriate position in the memory-side cache 114. Block 214 provides the data and completes the request.

Each entry in the memory-side cache 114 includes control bits, including a "valid" bit 28 and a "consumed" bit 26. The valid bit 28 indicates whether the cached entry is filled with valid data or not (e.g., whether that entry has been initialized with a particular data object from the main memory 106. The consumed bit 26 indicates whether there is an action being performed on the bit currently (e.g., a paired access may include a read and a write operation, and the consumed bit 26 will not be set until both have completed). Once a paired access is complete, the data object may be kept in the memory-side cache 114 to speed performance the next time a processor 102 calls for access to that data object, at which time the memory controller 104 will note that the consumed bit 26 is set and proceed. Policies are provided below in Table 1 for managing locking of data stored in the memory-side cache 114.

TABLE 1

| Policy | Read if | After read | Write if | After write |
|---|---|---|---|---|
| Event/ messaging | Locked | Unlock & consume | Unlocked | Lock |

TABLE 1-continued

| Policy | Read if | After read | Write if | After write |
| --- | --- | --- | --- | --- |
| Reservation | Unimportant | Lock (reserve) | Locked | Unlock & consume |
| Read-modify-write | Unlocked | Lock | Locked | Unlock & consume |

When paired memory accesses (e.g., write-read for event/messaging and read-write for reservations and read-modify-write events) complete, the access pair is consumed and the appropriate consume control bit 26 is set. Alternatively, read-modify-write can be performed in a wait-free manner using reservation. Other exclusive controls, such as mutex, write-lock, etc. can also be performed using read-modify-write. For the above policies, the "consume" state and the "unlock" state are identical, so the consume bit 26 can be omitted. Although the consume state and the unlock state can be identical, it is helpful to maintain the consume bit 26 separately. When performing cache replacement, the state changes for each cache line go as, "valid and not consumed," to, "valid and consumed," to, "not valid." This corresponds to the appropriate priority determining how each cache line is kept or replaced. Referring to the cache-external lock bit information in the lock address list 108 may increase the latency in the cache line replacement. The consumed bit 26 is therefore reserved in the memory-side cache tag 24 in the control bits.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Referring now to FIG. 3, an exemplary processing system 300 is shown which provides additional low-level details on the processing system 100. The processing system 300 includes at least one processor (CPU) 304 operatively coupled to other components via a system bus 302. The at least one CPU 304 may represent respective processors 102 or may include multiple processors 102 in a single unit, e.g., as individual processing cores. The CPU 304 includes integrated processor-side cache 306, providing local hardware caches for the respective processors 102. A Read Only Memory (ROM) 308, an input/output (I/O) adapter 320, a sound adapter 330, a network adapter 340, a user interface adapter 350, and a display adapter 360, are operatively coupled to the system bus 302. A Random Access Memory (RAM) 310 is coupled to the system bus 302 by way of memory controller 104.

A first storage device 322 and a second storage device 324 are operatively coupled to system bus 302 by the I/O adapter 320 (e.g., the memory controller 104) and may represent main memory 106. The storage devices 322 and 324 can be any of a disk storage device (e.g., a magnetic or optical disk storage device), a solid state magnetic device, and so forth. The storage devices 322 and 324 can be the same type of storage device or different types of storage devices.

A speaker 332 is operatively coupled to system bus 302 by the sound adapter 330. A transceiver 342 is operatively coupled to system bus 302 by network adapter 340. A display device 362 is operatively coupled to system bus 302 by display adapter 360.

A first user input device 352, a second user input device 354, and a third user input device 356 are operatively coupled to system bus 302 by user interface adapter 350. The user input devices 352, 354, and 356 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 352, 354, and 356 can be the same type of user input device or different types of user input devices. The user input devices 352, 354, and 356 are used to input and output information to and from system 300.

Of course, the processing system 300 may also include other elements (not shown), as readily contemplated by one of skill in the art, as well as omit certain elements. For example, various other input devices and/or output devices can be included in processing system 300, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 300 are readily contemplated by one of ordinary skill in the art given the teachings of the present principles provided herein.

Figure 4:
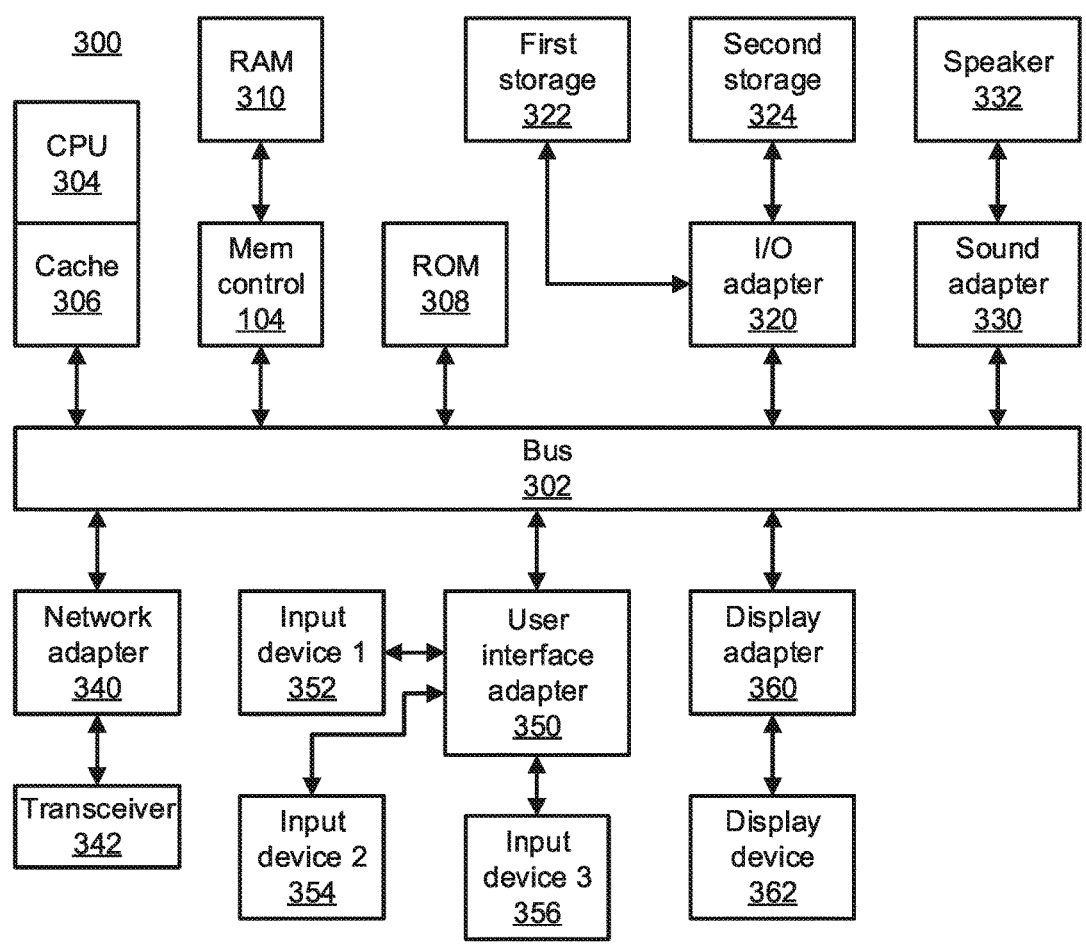
FIG. 4 is a block diagram of a processing system in accordance with an embodiment of the present invention.
Figure 5:
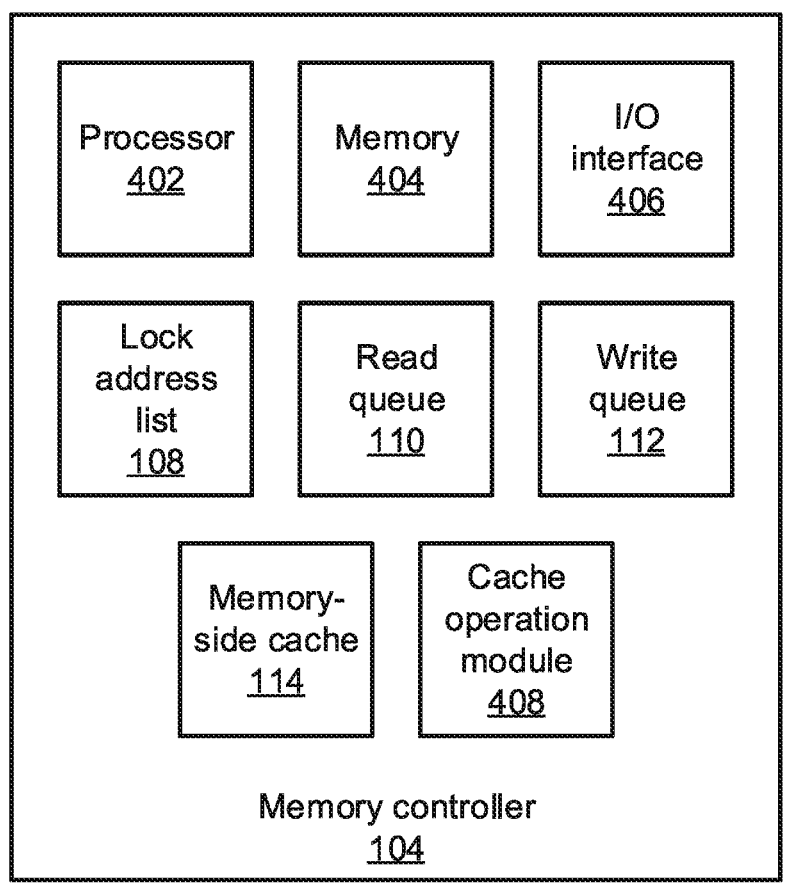
FIG. 5 is a block diagram of a memory controller in accordance with an embodiment of the present invention.

Referring now to FIG. 4, additional detail on memory controller 104 is provided. The memory controller 104 includes a hardware processor 402 and memory 404. The hardware processor 402 can be a general-purpose processing unit or may, alternatively, be purpose-built for the memory controller 104. An input/output (I/O) interface 406 communicates with the main memory 106 and with the processors 102, communicating receiving and responding to data requests from the processors 102 and accessing data objects from the main memory 106 as needed. The memory controller 104 further includes lock address list 108, read queue 110, and write queue 112 as described above, which may respectively be stored in regions of the memory 404. A memory-side cache 114 may also be stored in the general memory 404 or may be a separate physical memory component.

The memory controller 104 further includes one or more functional modules that may, in some embodiments, be implemented as software that is stored in memory 404 and executed by the hardware processor 402. In alternative embodiments, the one or more functional modules may be implemented as one or more discrete hardware components in the form of, e.g., an application specific integrated chip or a field programmable gate array. In particular, cache operation module 408 governs the operation of the memory-side cache 114, reviewing data requests to determine whether the requested data objects are present in the lock address list 108 and the memory-side cache 114 and directing I/O operations accordingly.

Having described preferred embodiments of memory-side caching for shared memory objects (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for memory-side shared caching, comprising:
    determining whether a requested memory access is directed to shared portion of memory by referencing a lock address list in a memory controller;
    if the requested memory access is for the shared portion of memory, determining whether an associated data object is present in a memory-side cache;
    if the associated data object is present in the memory-side cache, accessing the memory-side cache; and
    if the associated data object is not present in the memory-side cache, accessing an external memory.

2. The method of claim 1, further comprising performing a cache replacement with the associated data object if the associated data object is not present in the memory-side cache to enter the requested data object in the memory-side cache.

3. The method of claim 2, further comprising recording an address for the requested data object in a memory-side cache tag entry.

4. The method of claim 3, further comprising setting a "valid" control bit in a memory-side cache tag to indicate that an entry in the memory-side cache stores a valid data object.

5. The method of claim 3, further comprising setting a "consume" control bit in a memory-side cache tag for the associated data object to indicate whether a paired access to the associated data object has completed.

6. The method of claim 1, further comprising accessing the associated data object from a memory outside the memory controller if the requested memory access is not directed to shared portion of memory.

7. A non-transitory computer readable storage medium comprising a computer readable program for memory-side caching, wherein the computer readable program when executed on a computer causes the computer to perform the steps of claim 1.

8. A memory controller, comprising:
    an input/output (I/O) interface configured to communicate with one or more external processing elements and an external memory;
    a memory-side cache configured to store shared data objects;
    a lock address list; and
    a cache operation module configured to determine whether a requested memory access is directed to a shared portion of memory by referencing the lock address list, to determine whether an associated data object is present in the memory-side cache if the requested memory access is for the shared portion of memory, to access the memory-side cache if the associated data object is present in the memory-side cache, and to access the external memory if the associated data object is not present in the memory-side cache.

9. The memory controller of claim 8, wherein the cache operation module is further configured to perform a cache replacement with the associated data object if the associated data object is not present in the memory-side cache to enter the requested data object in the memory-side cache.

10. The memory controller of claim 9, wherein the cache operation module is further configured to record an address for the requested data object in a memory-side cache tag entry.

11. The memory controller of claim 10, wherein the cache operation module is further configured to set a "valid" control bit in a memory-side cache tag to indicate that an entry in the memory-side cache stores a valid data object.

12. The memory controller of claim 8, wherein the cache operation module is further configured to set a "consume" control bit in a memory-side cache tag for the associated data object to indicate whether a paired access to the associated data object has completed.

13. The memory controller of claim 8, wherein the cache operation module is further configured to access the associated data object from the memory outside the memory controller if the requested memory access is not directed to shared portion of memory.

14. A processing system, comprising:
    one or more processing elements;
    a main memory; and
    a memory controller in communication with the one or more processing elements and the main memory, the memory controller comprising:
    a memory-side cache configured to store shared data objects;
    a lock address list; and
    a cache operation module configured to determine whether a requested memory access is directed to a shared portion of memory by referencing the lock address list, to determine whether an associated data object is present in the memory-side cache if the requested memory access is for the shared portion of memory, to access the memory-side cache if the associated data object is present in the memory-side cache, and to access the main memory if the associated data object is not present in the memory-side cache.

15. The processing system of claim 14, wherein the cache operation module is further configured to perform a cache replacement with the requested data object if the requested data object is not present in the memory-side cache to enter the requested data object in the memory-side cache.

16. The processing system of claim 15, wherein the cache operation module is further configured to set a "valid" control bit to indicate that an entry in the memory-side cache stores a valid data object.

17. The processing system of claim 14, wherein the cache operation module is further configured to set a "consume" control bit for the requested data object to indicate whether a paired access to the requested data object has completed.

18. The processing system of claim 14, wherein the cache operation module is further configured to access the associated data object from main memory if the requested memory access is not directed to a shared portion of memory.

19. The processing system of claim 14, wherein the one or more processing elements each comprise a processor-side cache configured to store non-shared data objects.

\* \* \* \* \*